March 11, 1969 — G. G. F. SMEETS — 3,431,623
SLOTTED LOCKING FERRULE
Filed May 3, 1967
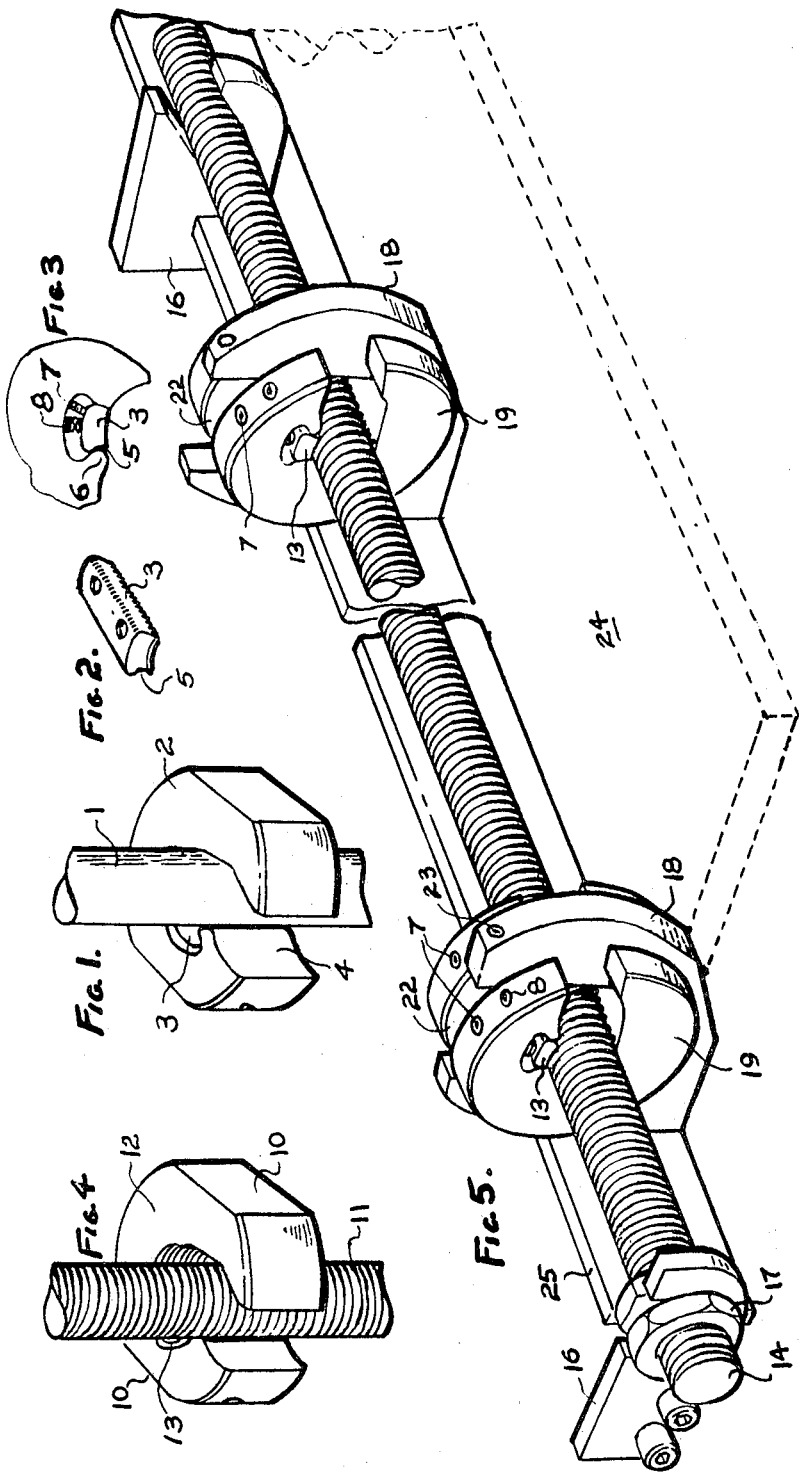

United States Patent Office 3,431,623
Patented Mar. 11, 1969

3,431,623
SLOTTED LOCKING FERRULE
Gerard Gaston Frans Smeets, 140 Cornwall Heights, Brampton, Ontario, Canada
Filed May 3, 1967, Ser. No. 635,789
U.S. Cl. 29—240
Int. Cl. B23p *19/04*
6 Claims

ABSTRACT OF THE DISCLOSURE

The invention concerns an internally threaded ferrule device which can be threaded along a shaft. The ferrule is slotted in one side so that it can be laterally moved into threaded contact position onto a threaded shaft. The slotted side of the ferrule is partially closed by a spring biased locking member which provides snap-on action of the ferule and then spring biased thread contact between the ferrule and the shaft. The spring biased locking member can be fixed in position to prevent inadvertent removal of the ferrule or if sufficient pressure is applied between the locking member and the threaded shaft the ferrule can be locked against turning or threading along the shaft. In another form of the invention use is not made of threads and the ferrule can be slid along the shaft and locked in the desired position by the locking member.

Field of invention

This invention relates to a ferrule which may be slipped laterally onto a shaft and locked in position. The ferrule may also take the form of a threaded nut by providing internal threads with allowance still being made for lateral slip onto a threaded shaft or bolt, thereafter the ferrule acts as a normal threaded nut.

Description of prior art

In the past with long shafts onto which a ferrule or nut had to be placed and positioned it was necessary to provide a free end of the shaft over which the ferrule was moved onto the shaft. When the ferrule was in the form of a threaded nut the process of running the nut over a long threaded shaft was tedious and time consuming.

A particular case of tedious nut adjustment is in a metal working machine where work piece stops or guides are provided on a long threaded shaft known as a back gauge bar, a swingable guide member being positioned on the shaft by means of a pair of nuts or a nut having an annular groove in which the swingable guide member fits to partially encircle the nut.

Summary of invention

The swingable guide member is prevented from falling off by means such as an adjustable set screw.

The present invention overcomes many of the drawbacks of prior ferrules, nuts and adjustable guide means when the particular embodiment of the invention suitable for the task is employed.

It is therefore an object of this invention to provide a ferrule member which may be laterally slipped onto a shaft and readily locked in position when thus assembled.

It is a further object of this invention to provide a ferrule in the form of a threaded nut which may be laterally slipped onto a shaft and rapidly adjusted for normal threaded travel along the shaft.

It is still another object of the invention to provide a nut member which allows lateral assembly onto a threaded shaft and which may be locked in position on the threaded shaft to prevent inadvertent movement along the shaft.

It is also an object of the invention to provide a threaded nut which in conjunction with a guide member forms a stop nut assembly which can be readily assembled on or removed from the back gauge bar of a metal working machine.

Description of the drawings

The invention will now be described with reference to the figures of the drawing in which:

FIGURE 1 shows a view of a ferrule, according to the invention, assembled on a shaft.

FIGURE 2 shows an enlarged view of the locking member of a threaded ferrule according to the invention.

FIGURE 3 shows a side view of the locking member in position in a ferrule.

FIGURE 4 shows a view of a threaded ferrule or nut assembled on a threaded shaft.

FIGURE 5 shows a nut according to the invention wherein the nut is employed to adjust the position of a stop or guide member on the back gauge bar of a metal working machine.

Description of preferred embodiments

Referring now to FIGURE 1, a shaft 1 is shown partially encircled by a ferrule 2 which has one side slotted or cut-away as shown at 4. A locking member 3 is shown pressed against the shaft 1 by means, for instance of set screws 7. The locking member 3 partially closes off slot 4 to prevent lateral removal of the ferrule 2 from shaft 1.

The locking member 3 is best shown in FIGURES 2 and 3. Member 3 is provided with a longitudinal groove 5 into which a portion 6 of the ferrule projects when the member 3 is in position in the longitudinal side opening of the inner opeing provided in the ferrule 2. This prevents the locking member 3 from dropping into the central opening of the ferrule 2 under pressure of bias springs 8 two of which are generally required. Set screws 7 are provided to exert a positive pressure and are adjusted to press the locking member 3 against the shaft 1 when the proper positioning of the ferrule on a shaft has been achieved. Pressure of the screws can be adjusted initially to allow forced sliding along the shaft before final locking by increased pressure of screws 7 on locking member 3.

To facilitate this and prevent longitudinal sliding of locking member 3 with respect to ferrule 2 shallow holes, into which set screws 7 project, may be provided in the outer longitudinal surface of member 3. Here again it is preferable to use two set screws for obtaining a better distribution of pressure of member 3 onto a shaft upon which the ferrule 2 is mounted.

FIGURE 4 shows an embodiment wherein a nut ferrule 12 is provided with its inside surface and that of the lock member 13 threaded to match the thread on a bolt 11. The ferrule 12 is laterally slipped onto the thread shaft 11 and the set screws, not shown, are adjusted to prevent removal of the ferrule 12 but to allow longitudinal threaded adjustment along the shaft 11. Flat sides 10 are provided on ferrule 12 so that a wrench may be used for turning it about the threaded shaft. When the proper position has been attained the locking member 13 may be pressed tightly onto the shaft to lock the nut ferrule in position thereon.

FIGURE 5 shows an embodiment of the invention wherein the nut type ferrule of FIGURE 3 is modified and utilized to retain guide members of a sheet material working machine in position on a back gauge rod.

In this embodiment a back gauge rod 14 is mounted at the edge of a sheet material working machine table, not shown, by means of a support bar 25 provided with cantilever type supports 16, two of which are shown. At the left hand support a shaft 14 is secured by nuts 17. The other end of shaft 14, not shown, is similarly secured.

Threaded ferrules 19 are each provided with a centrally located annular groove 22 into which fits a swingable stop or guide 18. Guide member 18 is mounted in groove 22 partially encircling ferrule 19. The guide 18 is prevented from falling off ferrule 19 by a set screw 23. The stops or guides 18 are freely swingable about ferrule 19 so that a sheet of material 24 may be passed therebeneath and in which case the guide turns partially about the ferrule and/or is lifted up to ride on the sheet material work piece. This action is necessary since the guides co-operate with an edge of the work piece and several are provided on the back gauge rod to allow for rapid and varied displacement with respect to a working head of the metal working machine.

It will be readily apparent that the stop or guide assemblies comprising ferrule 19 and guide 18 may be roughly adjusted by turning the guide so that its open side corresponds to the open side of the ferrule, removing ferrule 19 from shaft 14, set screws 7 having been previously loosened, and replacing the ferrule on the shaft at the desired location. Fine adjustment of the ferrule or guide member is achieved by screwing the ferrule along the shaft after adjusting set screws 7 to prevent inadvertent removal. After final adjustment the ferrules may be locked in position by further adjustment of screws 7 to press locking member 3 firmly against shaft or rod 14.

Other embodiments of the invention may be obvious to those skilled in the art and which do not depart from the spirit and scope of the present invention are covered by the appended claims.

I claim:
1. An assembly for mounting on a shaft comprising a ferrule having an opening therethrough and one side slotted to allow lateral movement of a shaft through the slot to a position centrally of the opening provided in the ferrule, a longitudinal slot in the opening of the ferrule aligned axially with said opening, a longitudinal locking member located in the axial slot and having an inner face corresponding in contour with the inner face of the opening, spring means biasing said locking member inwardly to partially close the side slot but allow lateral snap on of the ferrule onto a shaft, a stop provided in the ferrule for preventing said locking member from completely entering said opening under said spring pressure, and adjustable means to positively hold said locking member against a shaft upon which the ferrule is mounted.

2. The assembly as claimed in claim 1 wherein the inner surfaces of the opening of the ferrule and the locking member are threaded to cooperate with threads on a shaft upon which said ferrule is to be mounted.

3. The assembly as claimed in claim 2 wherein the outer side surface of the ferrule is flatted to accommodate turning with a wrench.

4. The assembly as claimed in claim 2 wherein the outer surface of the ferrule is provided with an annular groove accommodating a swingable guide member, the whole being adapted for mounting on the guide bar of a work-piece stop system of a material fabricating machine.

5. The assembly as claimed in claim 1 wherein the outer side surface of the ferrule is flatted to accommodate turning with a wrench.

6. The assembly as claimed in claim 1 wherein the outer surface of the ferrule is provided with an annular groove accommodating a swingable guide member, the whole being adapted for mounting on the guide bar of a work-piece stop system of a material fabricating machine.

References Cited

UNITED STATES PATENTS

| | | | |
|---|---|---|---|
| 597,329 | 1/1898 | Rylander | 287—52.08 |
| 1,971,477 | 8/1934 | Blackburn | 287—52.08 X |
| 2,153,474 | 4/1939 | Naylor | 24—135 |
| 2,931,264 | 4/1960 | Dallman | 85—33 |

ROBERT C. RIORDAN, *Primary Examiner.*

J. C. PETERS, *Assistant Examiner.*

U.S. Cl. X.R.

24—135; 85—33; 287—52.08